June 3, 1952 R. M. MANNING 2,598,706
SELF-AIR ESCAPING FLOATING VALVE
Filed Dec. 23, 1947

INVENTOR.
Robert M. Manning
BY Victor J. Evans & Co.
ATTORNEYS

Patented June 3, 1952

2,598,706

UNITED STATES PATENT OFFICE 2,598,706

SELF AIR-ESCAPING FLOATING VALVE

Robert M. Manning, Pampa, Tex.

Application December 23, 1947, Serial No. 793,459

1 Claim. (Cl. 137—68)

This invention relates to valves, and more especially to a self air-escaping and self-starting floating valve.

An object of the invention is to provide a floating member which is of relatively larger size than the valve seat opening it is adapted to close, so that the floating member will have the advantage of being able to break away existing vacuum when seated to make the valve self-starting.

Another object of the invention is to provide a valve of this type that will permit free flow of liquid through the valve when the line is open, and will automatically close the line in which the valve is installed after the liquid ceases to flow.

With the above and other objects and advantages in view, the invention consists of the novel details of construction, arrangement and combination of parts more fully hereinafter described, claimed and illustrated in the accompanying drawing in which:

Figure 1:
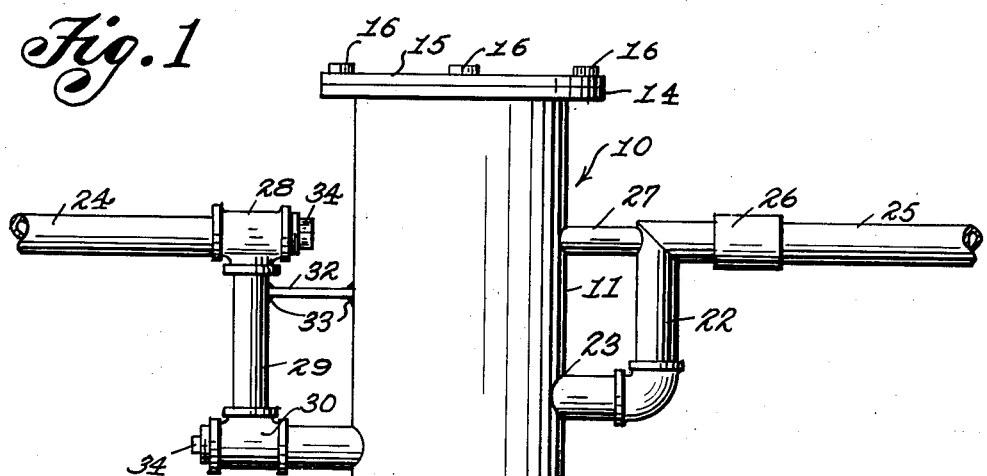
Figure 1 is an elevational view of an embodiment of the invention.
Figure 2:
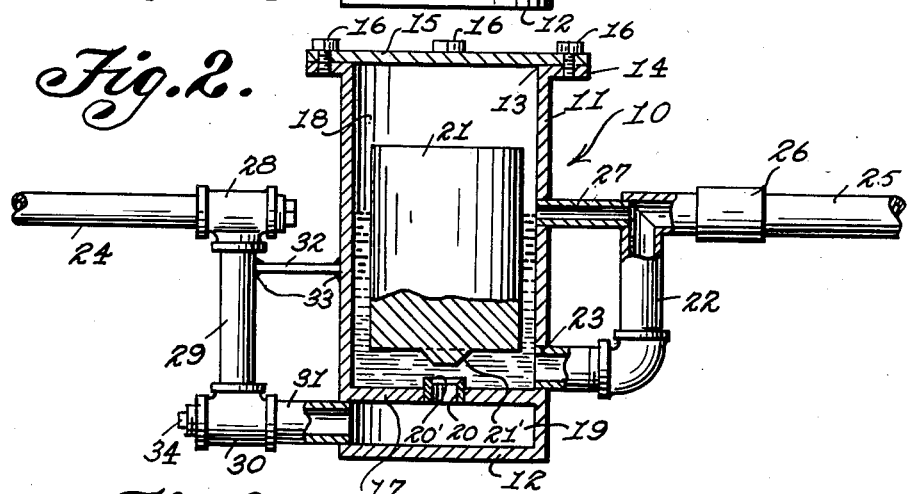
Figure 2 is a vertical, sectional view on the line 2—2 of Figure 3.
Figure 3:
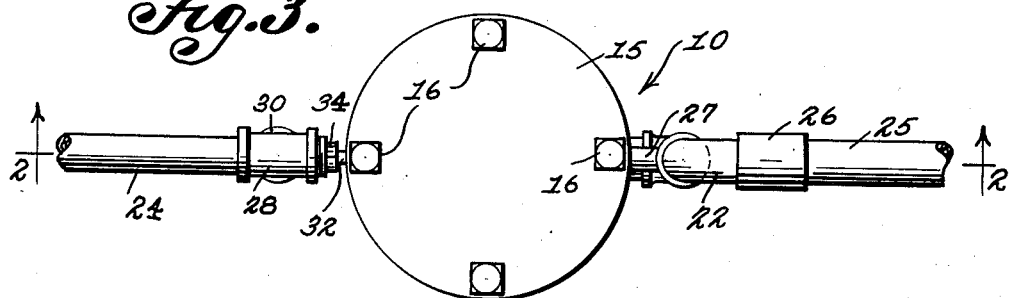
Figure 3 is a top plan view of Figure 1.

Referring more in detail to the drawing, the valve embodying the invention is generally designated by the reference numeral 10.

The valve 10 comprises a tubular valve casing 11, having a closed bottom 12 and an open top 13. An annular flange 14 extending at right angles from the top of the casing 11 provides a support for the disc-shaped cover 15 which, by means of fasteners 16, is removably secured to the flange 14.

Near the bottom of the casing 11, there is formed integral with the casing, a partition 17, which divides the casing into the upper or float chamber 18, and the lower chamber 19. Centrally of the partition 17, there is provided a tubular member 20, having the conical shaped valve seat 20' and the height of the member 20 is greater than the thickness of the partition 17.

Within the chamber 18, there is located the float or valve member 21, the circumference of which is much larger than the circumference of the member 20. The float 21 is provided with a conical shaped portion 21' centrally of its bottom which is adapted to engage and be seated in the valve seat 20' when the float 21 moves downwardly in the casing 11. When the member 21 is in position to have the portion 21' thereof engage the valve seat 20', the height of the member 20 will raise the float above the partition 17, so that the vertical fluid drop 22 will form communication with the housing 11 at 23, slightly below the bottom of the valve 21. A float level is maintained in the housing by means of the vertical fluid arrester 29 and the outlet pipe 24, and the vertical drop 22 and inlet pipe 25. The pipes 24 and 25 extend in opposite directions to each other, but are in the same horizontal plane with each other.

The drop 22 is connected to the inlet pipe 25 by a coupling 26, and an escape tube 27 forms communication between the housing 11 and drop 22.

The outlet pipe is connected to a T-coupling 28, which is connected to the vertical arrester pipe 29 which, in turn, is connected to the T-coupling 30 which, by means of the pipe 31, is connected to the housing 11 to form communication with the chamber 19. A brace rod 32 welded at 33 at its opposite ends to the pipe 29 and housing 11 braces the arrester pipe 29 to retain it in the normal vertical position. Clean out plugs 34 close the couplings 28 and 30 at their remaining openings.

There has thus been provided a floating valve which is of greater circumference than its valve seat, thereby having the advantage of being able to break any vacuum occurring in the valve housing to permit the valve to open the valve seat.

In operation, the valve 10 is placed in position to prevent air from passing through the housing 11, and valve seat 20 out of the housing into the outlet pipe 24. Thus a floating basin or chamber 18 is created which is provided with a constant float level caused by the horizontal alinement of the pipes 24 and 25. This level is maintained by the fluid arrester 29 which causes the liquid to rise against the force of gravity to cause constant back pressure in the chamber 18 and maintain the liquid level.

The air escape pipe 27 being in the same line with pipes 24 and 25 permits the air to escape from the chamber 18 out of the pipe 25. Thus any air below the liquid level which would interfere with the operation of the float valve 21 would escape through the pipe 27. The pipes 29 and 31 and their manner of communication with the housing 11 permit free flow of the liquid at all times. Should the liquid cease to flow, the float will close the seat 20 and prevent air passing through the valve into the line 24.

It is believed that from the foregoing description, the structure and operation of the invention will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

An apparatus of the type described, comprising a valve housing, a partition in said housing dividing said housing into upper and lower chambers, a float valve in said upper chamber, a valve seat in said partition adapted to form communication between said upper and lower chambers, said float valve being of greater circumference than said seat to permit free floating of said float valve, an inlet and an outlet means for said housing, an inlet pipe and an outlet pipe disposed in a horizontal plane on opposite sides of said housing, vertical pipe means connecting said inlet and outlet pipes to the inlet and outlet means for said housing, an air escape tube connected to said housing and to said inlet pipe in the same horizontal plane therewith.

ROBERT M. MANNING.

REFERENCES CITED

The following references are of record in the file of this patent:

UNITED STATES PATENTS

| Number | Name | Date |
|---|---|---|
| 648,180 | Stumpf | Apr. 24, 1900 |
| 699,170 | Hodges | May 6, 1902 |
| 1,140,666 | Cummings | May 25, 1915 |
| 1,643,818 | Manning | Sept. 27, 1927 |
| 1,689,477 | Capers | Oct. 30, 1928 |
| 1,750,489 | Pippin | Mar. 11, 1930 |